No. 697,847. Patented Apr. 15, 1902.
J. D. IHLDER.
ELECTRIC ELEVATOR SYSTEM.
(Application filed Aug. 21, 1901.)
(No Model.) 2 Sheets—Sheet 2.
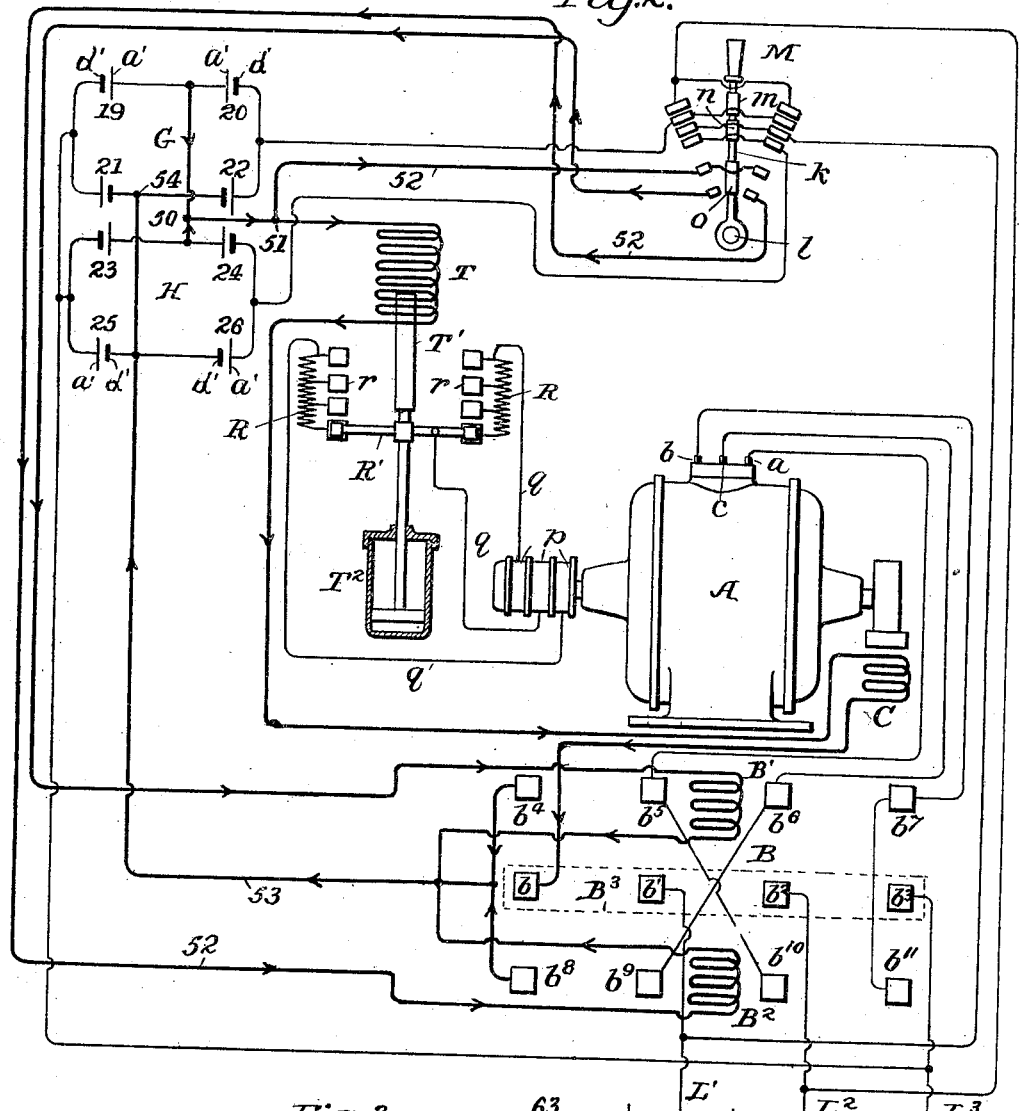
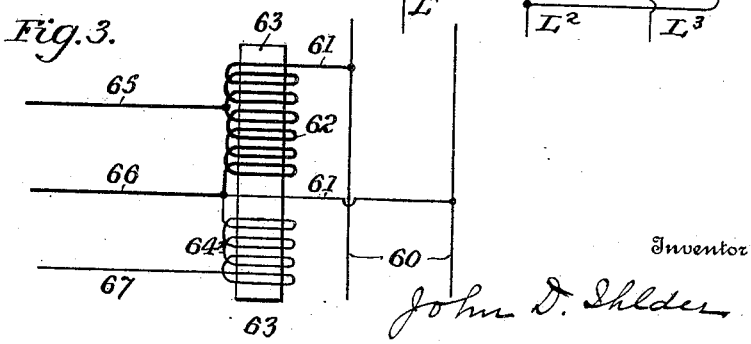

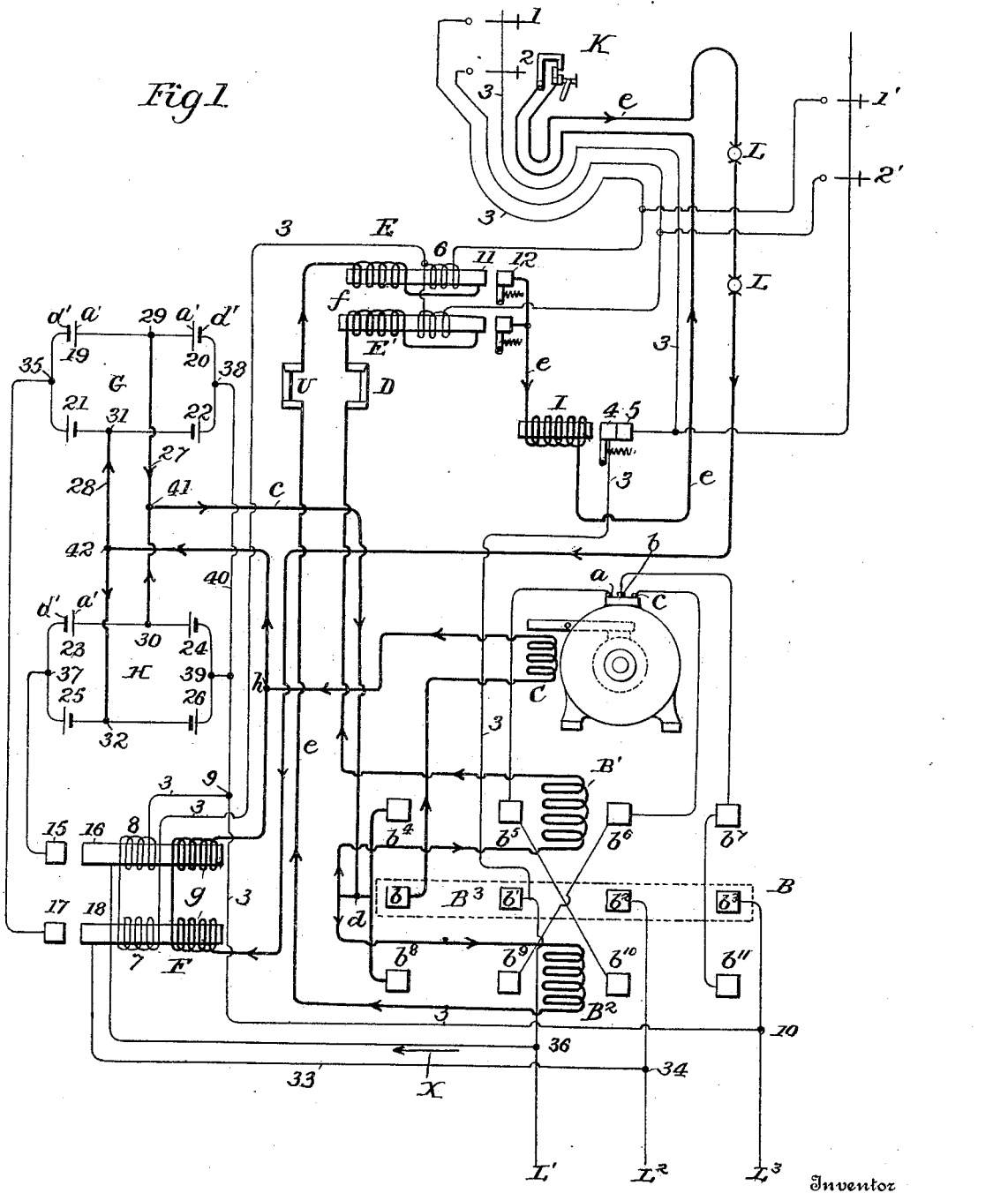

UNITED STATES PATENT OFFICE.

JOHN D. IHLDER, OF YONKERS, NEW YORK, ASSIGNOR TO OTIS ELEVATOR COMPANY, OF EAST ORANGE, NEW JERSEY, A CORPORATION OF NEW JERSEY.

ELECTRIC-ELEVATOR SYSTEM.

SPECIFICATION forming part of Letters Patent No. 697,847, dated April 15, 1902.

Application filed August 21, 1901. Serial No. 72,786. (No model.)

*To all whom it may concern:*

Be it known that I, JOHN D. IHLDER, a citizen of the United States, residing at Yonkers, in the county of Westchester and State of New York, have invented certain new and useful Improvements in Electric-Elevator Systems, of which the following is a specification.

My invention relates to the operation of electric motors, but more particularly to their operation in connection with electric elevators; and its object is primarily to provide an efficient and practical system of operation particularly suitable for elevator service where alternating-current motors are employed, whether single or poly phase.

When an elevator is run by an alternating-current motor, the use of the alternating current throughout the controlling-circuits of the system, including the controlling devices, as electromagnets, is objectionable for many reasons, notably because of the difficulty in constructing suitable electromagnets of sufficient power free from noise and vibration. My invention is designed to obviate many of the difficulties heretofore encountered in the use of alternating-current motors for elevators.

My invention consists in providing controlling means for an alternating-current motor, which controlling means are operated by rectified or direct current obtained from alternating current instead of being operated, as usual, by alternating current. Any suitable means may be employed to obtain the rectified current required, as rotary transformers; but I prefer to use electrolytic rectifying-cells or what are termed "asymmetric" conductors, in which an anode of aluminium and a cathode of any suitable substance, as lead, are immersed in a suitable electrolyte. When the terminals of an alternating-current circuit are connected to the electrodes of such a cell, the well-known phenomenon occurs—namely, that but one impulse can pass through the cell—that is, current cannot ordinarily pass from aluminium to lead, aluminium being the anode, but can freely pass in the opposite direction from lead to aluminium when aluminium becomes the cathode.

When an alternating-current motor is employed for elevator-work, I prefer to rectify by means of these electrolytic cells a portion of the supply-current and utilize this rectified portion for energizing certain of the controlling-circuits and for operating the controlling devices of the motor. To obtain a direct current from alternating current of sufficient smoothness for power purposes, as in running a large elevator-motor, it is necessary to use large and expensive cells or the loss of power will be prohibitive. The same objection applies to transforming the whole of the alternating current by means of a rotary transformer. I therefore employ rectified current merely as an auxiliary in the operating-circuits, retaining the alternating current to furnish power to the motor itself. The direct or rectified current power is consequently small, and the loss sustained in the cells, or which would be sustained in a rotary transformer, is practically of no importance.

Referring to the drawings, in which my invention is more fully set forth, Figure 1 is a diagram of circuits embodying my invention. Fig. 2 is a diagram of circuits, showing a modification of the same. Fig. 3 illustrates a means for obtaining a shifted or split phase from single-phase current to be used in connection with electrolytic rectifying-cells in my system of control.

My invention may be applied to any elevator system; but for convenience of illustration I have shown it partly in connection with that general class of electric elevators disclosed in my application, Serial No. 660,873, filed December 6, 1897, wherein means are provided for bringing the elevator-car automatically to a particular floor ready for use by the operation of a push-button or circuit-closer for each floor.

In the present application a system for automatically operating the car is shown in connection with two floors, it being understood that the means disclosed may be extended to any number of floors or stations, and means are also shown on the car for bringing the car to any desired floor or station, while substantially the same kind of reversing switch mechanism is described in connection with the elevator-motor as disclosed in my former application referred to.

In the drawings, A represents an electric motor for operating the elevator-car, the car and connections between it and the motor for operating it being omitted, as they may be of any well-known and desired construction, it being only necessary that they are such connections as will move the car in one direction or the other, according to the direction of the rotation of the motor. As shown, A is an alternating-current motor, preferably an asynchronous single or poly phase motor, a two-phase asynchronous motor on a three-wire circuit being shown in both Figs. 1 and 2 by way of illustration merely.

$a\ b\ c$ represent binding-posts upon the motor, to which the terminals of the field-circuits of the motor are connected and to which the terminals of the supply-circuit are also connected, it being understood that any suitably-wound stator may be used for a two-phase motor with proper connections applicable to a three-wire system.

In order to control the circuits of the motor, I make use, as hereinbefore stated, of substantially the same type of electric reversing-switch B as described in my prior application referred to; but this may of course vary in construction and operation, it being only necessary to be so constructed as to control the circuits of the motor and to be itself controlled by the elevator-operating circuits. In the present instance the electric reversing-switch consists, essentially, of two magnets $B'\ B^2$, arranged opposite each other, with an armature $B^3$, adapted to be attracted by one or other of the magnets $B'\ B^2$. Mounted upon the armature $B^3$ are a number of double-faced contacts $b\ b'\ b^2\ b^3$ of any suitable conducting material and arranged to coöperate with similar contacts arranged on either side of the armature and designated as $b^4\ b^5\ b^6\ b^7\ b^8\ b^9\ b^{10}\ b^{11}$, as indicated in the diagram. The mechanical construction of all these contacts is preferably the same as described in my former application referred to.

When a circuit is completed through one or the other of the electromagnets $B'\ B^2$, the armature $B^3$ is moved to one or the other side to close the circuit between the double-faced contacts and one or the other of the sets of contacts corresponding with the magnet energized, and the motor connections are such that the circuits through the motor will be completed in a direction to cause it to raise or lower the elevator, as required. As shown, the leads $L'\ L^2\ L^3$ of the supply-circuit—in this instance a two-phase supply-circuit—are connected, respectively, to the contacts $b'\ b^2\ b^3$, $L^3$ being represented as the common return-wire for the system. Connections are then made between binding-posts $a\ b\ c$ and the motor and contacts $b^5\ b^6\ b^7$, while suitable cross connections are shown between contacts $b^5\ b^{10}$ $b^6\ b^9$ and between contacts $b^7\ b^{11}$. Under these circumstances $L^3$ always acts as a common return for the system regardless of the direction in which the motor is rotating, while the remaining connections between the contacts of the reversing-switch and between the reversing-switch and the motor serve to cause the rotary field of the motor to tend to rotate in one direction or the other, according to the position of the switch.

Contacts $b\ b^4\ b^8$ on the reversing-switch are suitably connected to each other and with controlling means for a brake, (shown as a brake-magnet C,) adapted to remove the brake from the operating mechanism when the motor is started and to replace it when the motor stops. As hereinafter to be described, the brake-magnet C and electromagnets $B'\ B^2$ for the reversing-switch may be included under the term "controlling means" for the motor, under which term may also be included the reversing-switch B, and these controlling means are operated by direct or rectified current instead of by alternating current, the circuits, including the brake-magnet C and reversing-magnets $B'\ B^2$, being energized by rectified current, and these circuits, together with all the circuits energized by rectified current, are shown as heavy black lines in the diagrams, the light lines denoting those circuits energized by alternating current.

What I have termed an "auxiliary alternating push-button circuit" includes control devices and push-buttons or circuit-controllers on the floors or stations and on the car, as shown, 1 2 representing the push-buttons on the car corresponding to given floors, while 1' 2' represent push-buttons at two stations, 1' 2' being connected in shunt to 1 2. The arrangement of circuits and connections in the system is such that upon pressing a push-button upon the car, as push-button 1, the motor will be started and the car operated to be brought to the station corresponding to the particular push-button pressed and there automatically stopped.

Should push-button 1 on the car or 1' at a station be pressed, the auxiliary alternating-current push-button system will be completed as follows: Starting from contact $b'$ on reversing-switch B, the circuit 3 passes through normally closed contacts 4 5, continues through push-button 1 on the car, if the car push-button is the one operated, passes from thence through the alternating-current winding 6 of a suitable electromagnet E. Thence the circuit 3 continues through the alternating-current windings 7 8 of a suitable electromagnet F to the point 9 and to the point 10 on the common return-wire $L^3$. Electromagnets E and F thus energized by alternating current close the normally open contacts 11 12 15 16 17 18, the closing of contacts 11 12 completing the controlling-circuits energized by rectified current, while the closing of contacts 15 16 17 18 completes circuits shown as connected to the supply-circuit of alternating current and including suitable current-rectifying devices, shown in this instance as electrolytic rectifying means, composed of cells containing a suitable electrolyte and electrodes. It is to be understood that in place of these electrolytic cells any suitable means for rectifying alternating current either from the supply-circuit or from an independent source of alternating current may be used, rotary transformers being particularly applicable in this instance.

When a polyphase motor and supply-circuit are used, it may be sufficient to rectify but one phase of the alternating current; but I have shown both phases of a two-phase current as rectified. The particular electrolytic cell I prefer to use in rectifying alternating current is that known as the "aluminium cell," and I have found that electrodes of aluminium and lead in a solution of ammonium carbonate works satisfactorily on a potential of sixty volts, which is a convenient potential for this purpose; but where a higher potential is used it may be readily transformed down from the supply-circuit.

In the diagrams the cells are represented by 19 20 21 22 23 24 25 26, connected in parallel sets of four each, which is a convenient arrangement for the purposes set forth, with connectors 27 and 28, connecting parallel sides of each set of cells between the points 29 and 30 and 31 and 32, respectively. In all of the cells the longer line, representing one of the electrodes, (marked $a'$,) represents aluminium, while the shorter line, representing the other electrode, (marked $d'$,) represents lead. Suitable electrical connection is made from a point 34 on one of the wires $L^2$ by a wire 33 through contacts 17 18 to a point 35 on the set of cells G, while connection is made from a point 36 on wire L' through contacts 15 16 to a point 37 on the set of cells H and a common connection is made from the points 38 and 39 on the opposite sides of the sets of cells through wire 40 to the point 9. In order that a rectified current may be taken from the arrangement of cells and connections, as shown, electrical connection must be made between the connectors 27 and 28, and it is in the connection shown between the points 41 and 42 on the said connectors that I have included my controlling means and circuits for the motor—namely, the brake-magnet C, reversing-magnets B' B², and reversing-switch operated by the reversing-magnets. A portion of the current only, therefore, from the supply-circuit is rectified, and to show in what manner the current is rectified let it be assumed that an impulse is starting from the point 36 on wire L' in the direction of the arrow X. This impulse will pass, provided contacts 15 16 are closed, to a point 37 on the sets of cells H, thence through cell 23 to the point 30, from thence to the point 41 on connector 27, over the controlling-circuits marked in heavy lines, hereinafter to be more fully described, back to point 42 on connector 28 to the point 32, thence through cell 26 to the point 39, and back through wire 3 to the point 10 on the return-wire $L^3$. Assuming this impulse to have been a positive one, the negative impulse of the same phase would trace these circuits in a reverse direction, passing from a point 39 on the set of cells H, through cell 24 to the point 30, to the point 41 on connector 27, through the controlling-circuits, back to point 42 on connector 28, to the point 32, through cell 25 to the point 37, and back to the supply-circuit. Precisely the same occurrence takes place in the set of cells G for the other phase of the current, it being noted that all the impulses of both phases are rectified and pass out in the same direction from the point 41 on connector 27, through the controlling-circuits and back to point 42, and from thence through the cells to the supply-circuit.

Assuming that push-button 1 on the car has been pressed, closing the auxiliary alternating-current push-button circuit 3, as hereinbefore described, and energizing the alternating-current coils of magnets E and F, thus closing contacts 11 and 12, 15 and 16, 17 and 18, the circuits to the sets of electrolytic rectifying-cells will be completed, and rectified current will be received in the controlling-circuits as follows: A rectified current will pass from the point 41 by wire $c$ to the point $d$, there branching through one or the other of the coils of the electromagnets B' B²—in this instance passing through the coil of electromagnet B²—thence by wire $e$ through limit-switch U for limiting the movement of the car, thence through direct-current winding $f$ of magnet E, through contacts 11 and 12, through a magnet I, controlling contacts 4 5, thence to a safety-switch K on the car and still by wire $e$ through door-contacts L at the landings, thence through the direct-current windings $g$ of electromagnet F to the point 42 on connector 28, and out. From the point $d$ adjacent to electromagnets B' B² branches pass to the contacts $b^4$ $b^8$, while a brake-magnet is shown connected between contact $b$ and the point $h$. The controlling-circuits having been energized with rectified current, magnet B² will attract armature B³, closing the reversing-switch B, to start the motor in a direction to cause the car to travel to the desired station, while the closure of the reversing-switch B, as seen, energizes the brake-magnet C, removing the brake. The car will then continue in movement until a suitable connection on a moving part of the elevator, as on the car, shall break the controlling-circuit at a floor-switch when the car has arrived at its destination, which breaks the motor-circuits and stops the motor.

It will be seen that included in the alternating-current push-button circuit 3 are contacts 4 5, which operate as a circuit-breaker, for these contacts are separated by the action of electromagnet I when the controlling-circuits are energized, so that the push-button circuit is broken and energy is not wasted through this circuit thereafter and interference is prevented between the different push-buttons on the car and on the landings, this circuit-breaker being closed upon the deënergization of the controlling-circuits when the car reaches its destination. The contacts 15 16 and 17 18 constitute circuit-closers, which are normally open and are adapted to be initially closed by the action of the alternating-current windings 7 and 8 of the magnet F, while after the circuit of these windings is broken between contacts 4 5 the direct-current windings $g$ of magnet F maintain the contacts of these circuit-closers closed. It will thus be seen that the circuit-closers comprising contacts 15 16 and 17 18 are jointly controlled by both alternating and direct current, the direct or rectified current being produced in the controlling-circuits, while the alternating current is supplied from the alternating-current push-button circuit 3. Magnet E is also arranged to hold the contacts 11 12, comprising a circuit-closer, in a closed position by means of its direct-current winding $f$ after the alternating-current circuit through winding 6 has been broken, and the operation of magnet E′ is the same as that of magnet E, but is only brought into action upon the pressure of a button 2 or 2′, limit-switch D being adapted to break the controlling-circuits for the motor and limit the movement of the car after a button 2 or 2′ is operated. The magnets E and E′ therefore each have windings in the controlling-circuits and in the alternating push-button circuit 3, respectively, and therefore jointly control their circuit-closers by means of alternating and direct current. The auxiliary alternating push-button circuit 3 is arranged to control the operation of the motor-controlling means, and it may be said to have this function, inasmuch as the motor-controlling circuits may not be energized unless by the prior closure of the circuit 3.

The diagram of Fig. 2 instead of push-buttons on the car shows a simple switch M, having an arm $k$, pivoted at $l$, and having three contacts $m\ n\ o$, adapted to close three separate circuits at each side of the switch, two alternating-current circuits and one rectified-current circuit. The alternating-current circuits are represented in light lines, while the direct or rectified current circuits are represented in heavy lines and may be termed, as before, the "motor-controlling" circuits operating the motor-controlling devices. By closing the switch M to the right a circuit will be completed through magnet $B^2$, while closing it to the left completes a circuit through magnet B′, these magnets being adapted to close the reversing-switch to one side or the other and cause rotation of the motor A in one direction or the other. The motor A is shown in this instance with three slip-rings $p$ and short-circuiting connections $q$ for the rotor, including resistance R in the circuit of the short-circuited rotor, which resistance is adapted to be cut out as the motor is started by means of an arm R′, traveling across contacts $r$ and actuated by suitable means, as an electromagnet T and armature T′, acting against a dash-pot $T^2$. By including suitable resistance R in the resistance of the short-circuited rotor the starting torque is greater than without such resistance, and I arrange the circuits in such manner that the magnet T for cutting out the resistance is energized by rectified current, the connections being preferably such that the brake-magnet C is in series with magnet T, although this is not necessary and is merely shown for convenience.

While the motor A may be single or poly phase, I show, as before, a two-phase asynchronous motor, while the supply-circuit is a three-wire system, in which $L^3$ is the return-wire, as before. Two sets of electrolytic rectifying-cells G and H are used with substantially the same connections from and to the leads L′ $L^2$ $L^3$ of the supply-circuit for the rectification of both phases of the current, and in this connection it may be stated that a simple arrangement of cells may readily be devised for the rectification of one or all phases of any polyphase current.

Assuming that switch M on the car is closed to the right, connections will be closed for the rectification of a portion of the alternating current from the supply-circuits, and rectified current will pass from the point 50 between the sets of cells as follows: from 50 to 51, thence by wire 52 through switch M and continuing by wire 52 through the winding of magnet $B^2$ by wire 53 to the point 54 on set of cells G and thence through the cells and by the alternating-current circuit, as shown, back to the supply-circuit. Magnet $B^2$ in closing the reversing-switch B closes a circuit through contacts $b\ b^8$, through brake-magnet C and magnet T, so that the brake is removed and armature T′ drawn down to cut out the resistance R from the circuit of the rotor. The motor A will then rotate and cause movement of the car until the circuits through the switch M are broken by movement of the arm $k$.

As my invention is for an economical and simple means of controlling motors, more particularly for alternating-current motors suitable for elevator-work, I have not shown in detail the construction and arrangement of parts of the operating apparatus nor particular windings of the rotor nor particular construction of the stator, as any suitable arrangement of parts may be adopted with my system of control without departing from the spirit of my invention. It will thus be seen that the controlling means shown are essentially mechanical controlling means; but they are electrically operated. In other words, the means shown for controlling a motor consist of switches and mechanical devices, which are operated electrically by solenoids or electromagnets, which magnets are energized by a rectified current, thus serving to operate the mechanical controlling means electrically by a rectified current.

Where a single-phase current only is available, I may use a transformer between the mains and the electrolytic cells with such an arrangement of windings on the transformer that the voltage received is that required for the cells, while an auxiliary winding causes a shifting or splitting of the phase. Such an arrangement of single-phase supply-circuit and transformer is shown in Fig. 3. Referring to Fig. 3, 60 represents single-phase supply-mains supplying current for the operation of the elevator-motor, it being presumed that a single-phase motor is used. Connections are made from the mains 60 by wires 61 to the primary winding 62 on the core 63 of a transformer, having an auxiliary winding 64 for splitting the phase. Presuming that it is desired to transform down from the voltage of the mains, then wires 65 and 66 are connected in such manner with the auxiliary winding 62 that the voltage between the wires 65 and 66 will be transformed down to the desired degree. The number of turns in the auxiliary winding 64 should then be the same as that number of coils included between the wires 65 and 66 on the primary winding 62. A wire 67 completes a circuit passing through the auxiliary winding 64. By the arrangement described it will be seen that a split phase is obtained from the transformer on a three-wire circuit, and the three wires 65 66 67 may be connected up with suitable sets of cells, as with sets arranged like those shown at G and H in the drawings. The rectified current then obtained will be sufficiently smooth and constant to operate the direct-current electromagnets.

Without limiting myself to the exact details of construction shown and described, I claim, and desire to obtain by Letters Patent, the following:

1. The combination with an electric motor, of controlling means therefor operated by rectified current, an alternating-current circuit, and means for supplying rectified current from said circuit to said controlling means, substantially as described.

2. The combination with an alternating-current motor, of mechanical controlling means therefor electrically operated by rectified current, and means for supplying rectified current to said controlling means, substantially as described.

3. The combination with an asynchronous motor, of controlling-circuits therefor energized by rectified current, substantially as described.

4. The combination with a polyphase asynchronous motor, of controlling-circuits therefor energized by rectified current, substantially as described.

5. The combination with an alternating-current supply-circuit, of a motor, mechanical controlling means therefor electrically operated by rectified current from said circuit, and means for supplying rectified current to said controlling means, substantially as described.

6. The combination with an alternating-current motor, of mechanical controlling means therefor and means for supplying rectified current to operate said controlling means, substantially as described.

7. The combination with an alternating-current supply-circuit, of a motor, controlling means therefor, and means for rectifying a portion of the current from said supply-circuit, for operating the controlling means, substantially as described.

8. The combination with an alternating-current supply-circuit, of a motor, controlling-circuits therefor, and means for rectifying a portion of the current from said supply-circuit for energizing the controlling-circuits, substantially as described.

9. The combination with an electric motor, of mechanical controlling means therefor, and electrolytic means for supplying rectified current to operate said controlling means, substantially as described.

10. The combination with an electric supply-circuit, of a motor, controlling means therefor, and electrolytic means for rectifying a portion of the current from said supply-circuit for operating the controlling means, substantially as described.

11. The combination with a polyphase supply-circuit, of a motor, controlling means therefor and electrolytic means for rectifying a portion of the current from said supply-circuit, for operating the controlling means, substantially as set forth.

12. The combination with a polyphase supply-circuit, of a motor, controlling means therefor and electrolytic cells for rectifying a portion of the current from said supply-circuit for operating the controlling means, substantially as described.

13. The combination with an alternating supply-circuit, of a motor, controlling means therefor, and aluminium current-rectifying cells for rectifying a portion of the current from the said supply-circuit for operating the controlling means, substantially as described.

14. The combination with an alternating-current supply-circuit, of a motor, controlling-circuits therefor, and electrolytic cells having an electrolyte of ammonium carbonate with lead and aluminium electrodes, for rectifying a portion of the current from said supply-circuit to energize the controlling-circuits, substantially as described.

15. The combination with an alternating-current motor and its supply-circuit, of an alternating-current branch circuit containing control devices, and controlling means for the motor operated by rectified current from the supply-circuit, substantially as described.

16. The combination with an alternating-current motor and its supply-circuit, of controlling means therefor operated by rectified current, and an auxiliary alternating-current circuit, containing devices for controlling the operation of the said controlling means, substantially as described.

17. The combination of an electric motor, controlling means therefor operated by rectified current, and an auxiliary alternating-current circuit controlling said controlling means, substantially as described.

18. The combination with an alternating-current supply-circuit, of a motor, controlling means therefor, means for supplying rectified current to said controlling means, and an auxiliary alternating-current circuit for controlling the supply of said rectified current, substantially as described.

19. The combination with an alternating-current supply-circuit, of a motor, mechanical controlling means therefor, means for operating said controlling means by rectified current, means for supplying rectified current to said controlling means, and means for controlling the operation of the controlling means, substantially as described.

20. The combination with a polyphase supply-circuit, of a polyphase motor, controlling means therefor, means for rectifying a portion of the current from the supply-circuit for operating said controlling means, and an auxiliary alternating circuit connected to the supply-circuit, for controlling the operation of the controlling means, substantially as described.

21. The combination of an electric motor, controlling means therefor, electrolytic means for supplying rectified current to operate the controlling means, and an auxiliary alternating-current circuit for controlling said controlling means, substantially as described.

22. The combination with an electric supply-circuit, of a motor, controlling means therefor, electrolytic means for rectifying a portion of the current from said supply-circuit, for operating the controlling means, and means for controlling the operation of the controlling means, substantially as described.

23. The combination with a two-phase three-wire circuit, of sets of electrolytic cells for rectifying one phase of the current, sets of cells for rectifying the other phase of the current, and connections whereby a rectified current is obtained, substantially as described.

24. The combination with a two-phase three-wire circuit, of sets of electrolytic cells connected in parallel to rectify both impulses of each phase of the current, connectors between the parallel sides of each set of cells and connections between said connectors, substantially as described.

25. The combination with a two-phase three-wire circuit, of sets of electrolytic cells connected in parallel to rectify both impulses of each phase of the current, connectors between the parallel sides of each set of cells and connections including electroreceptive devices between said connectors, substantially as described.

26. The combination with a polyphase circuit, of sets of electrolytic cells for rectifying each phase of the current, and connections whereby a rectified current is obtained, substantially as described.

27. In an elevator, the combination of the car, an electric motor for operating the same, controlling means for said motor operated by rectified current, an alternating-current circuit, and means for supplying rectified current from said circuit to said controlling means, substantially as described.

28. In an elevator, the combination with the car, and an electric motor for operating the same, of reversing means for the motor and a brake controlled by rectified current, an alternating-current circuit, and means for supplying rectified current from said circuit to the reversing means for the motor and the brake, substantially as described.

29. In an elevator, the combination of the car, an electric motor for operating the same, and reversing means for the motor controlled by rectified current, substantially as described.

30. In an elevator, the combination of the car, an electric motor therefor, an alternating-current supply-circuit mechanical motor-controlling means electrically operated by rectified current from said supply-circuit, and means for supplying rectified current to said controlling means, substantially as described.

31. In an elevator, the combination of the car, an electric motor therefor, an alternating-current supply-circuit and motor-controlling circuits, including reversing and brake magnets, energized by rectified current from said supply-circuit, substantially as described.

32. In an elevator, the combination of the car, an electric motor therefor, mechanical controlling means for the motor, and electrolytic means for supplying rectified current to operate said controlling means, substantially as described.

33. In an elevator, the combination of the car, an electric motor therefor, an alternating-current supply-circuit, controlling means for the motor, and electrolytic means for rectifying a portion of the current from said supply-circuit for operating the controlling means, substantially as described.

34. In an elevator, the combination of the car, an electric motor therefor, a polyphase supply-circuit, controlling means for the motor, and electrolytic cells for rectifying a portion of the current from said supply-circuit for operating the controlling means, substantially as described.

35. In an elevator, the combination with the car, of an electric motor therefor, an alternating-current supply-circuit, controlling means for the motor, and electrolytic cells having an electrolyte of ammonium carbonate with lead and aluminium electrodes, for rectifying a portion of the current from said supply-circuit to energize the controlling-circuits, substantially as described.

36. In an elevator, the combination of the car, an alternating-current motor for running the same, a supply-circuit for the motor, an alternating-current circuit containing push-buttons and switches, and controlling-circuits for the motor energized by rectified current from the supply-circuit, substantially as described.

37. In an elevator, the combination of the car, an electric motor therefor, a brake and reversing-switch for the motor, operated by rectified current, and an auxiliary alternating-current circuit, containing circuit-controllers, for controlling the operation of the brake and reversing-switch, substantially as described.

38. In an elevator, the combination of the car, an alternating-current motor therefor, a supply-circuit for the motor, controlling-circuits for the motor, and electrolytic means for rectifying a portion of the current from the supply-circuit to energize the controlling-circuits, substantially as described.

39. In an elevator, the combination of the car, an electric motor therefor, a brake, reversing-switch and starting resistance for the motor, operated by rectified current, and an auxiliary alternating-current circuit containing circuit-controllers for controlling the operation of the said brake, reversing-switch and starting resistance, substantially as described.

40. In an electric elevator, the combination of the car, an electric motor therefor, a brake and reversing-switch for the motor, electrolytic means for supplying rectified current for the operation of the brake and reversing-switch, and an auxiliary alternating-current circuit containing circuit-controllers for controlling the operation of the brake and reversing-switch, substantially as described.

41. In an apparatus for controlling elevators, the combination with the car and an elevator-motor, of motor-controlling means operated by rectified current, and an alternating-current circuit, including switches on the car, for controlling the operation of the motor-controlling means, substantially as described.

42. In an apparatus for controlling elevators, the combination with the car and an elevator-motor, of motor-controlling means, electrolytic means for supplying rectified current to the motor-controlling means, and an alternating-current circuit including switches on the car, for controlling the operation of the motor-controlling means, substantially as described.

43. In an apparatus for controlling elevators, the combination with the car and an elevator-motor, of motor-controlling circuits energized by rectified current, and a push-button circuit for the car and landings energized by alternating current and controlling the motor-controlling circuits, substantially as described.

44. In an apparatus for controlling elevators, the combination with the car and an alternating-current elevator-motor, of a supply-circuit for the motor, motor-controlling circuits, electrolytic cells for rectifying current from the supply-circuit, means for energizing the motor-controlling circuits with rectified current, and an alternating push-button circuit including the car and landings and controlling the supply of rectified current, substantially as described.

45. In an elevator, the combination of the car, and an electric motor, of controlling-circuits for the motor, energized by rectified current, circuit-closers in the motor-controlling circuits, an alternating-current push-button circuit, and means jointly controlled by the motor-controlling circuits and push-button circuit for operating said circuit-closers, substantially as described.

46. In an elevator, the combination of the car, and an electric motor, controlling-circuits for the motor energized by rectified current, circuit-closers in the controlling-circuits, an alternating-current push-button circuit including a circuit-breaker, means jointly controlled by the motor-controlling circuits and push-button circuit, for operating the circuit-closers, and means controlled by the motor-controlling circuits for operating said circuit-breaker, substantially as described.

47. In an elevator, the combination of the car and an alternating-current motor, circuits including current-rectifying means, circuit-closers in said circuits, motor-controlling circuits supplied with rectified current, an alternating-current push-button circuit, and means jointly controlled by the motor-controlling circuits and push-button circuit for operating said circuit-closers, substantially as described.

48. The combination with an alternating-current circuit, of a current-rectifier, circuits therefor including circuit-closers, and means jointly controlled by alternating and rectified current for operating said circuit-closers, substantially as described.

49. In an elevator, the combination of the car and an alternating-current motor, circuits including current-rectifying means, circuit-closers in said circuits, motor-controlling circuits supplied with rectified current, an alternating-current push-button circuit, and means jointly controlled by alternating and rectified current for operating said circuit-closers, substantially as described.

50. In an elevator, the combination of the car and an electric motor, controlling-circuits for the motor, supplied with rectified current, circuit-closers in the motor-controlling circuits, an alternating-current push-button circuit, and means jointly controlled by rectified and alternating current for operating said circuit-closers, substantially as described.

51. The combination with an asynchronous motor having a short-circuited armature including starting resistance in the rotor-circuit, of means operated by rectified current for cutting out said resistance on starting, substantially as described.

52. The combination with an asynchronous motor having a short-circuited armature including a starting resistance in the rotor-circuit, of a supply-circuit, electrolytic means for rectifying a portion of the current from the supply-circuit, and means controlled by the rectified current for cutting out the said resistance on starting, substantially as described.

53. In an elevator, the combination of a car and an asynchronous elevator-motor, a supply-circuit, electrolytic means for rectifying a portion of the current from the supply-circuit, and means controlled by the rectified current for cutting out the resistance from the rotor-circuit on starting, substantially as described.

54. In an elevator, the combination of a car and an asynchronous elevator-motor, a supply-circuit, electrolytic means for rectifying a portion of the current from the supply-circuit, and means controlled by the rectified current for cutting out resistance from the rotor-circuit on starting, and means for controlling the rectified current, substantially as described.

In testimony whereof I have signed my name to this specification in the presence of two subscribing witnesses.

JOHN D. HILDER.

Witnesses:
C. B. MANVILLE,
F. H. FEAN.